Jan. 21, 1969   G. CONVALLE ET AL   3,423,035
APPARATUS FOR OBTAINING MOLDING POWDERS OF POLYTETRAFLUOROETHYLENE
OF IMPROVED QUALITY
Filed July 11, 1966

United States Patent Office 3,423,035
Patented Jan. 21, 1969

3,423,035
APPARATUS FOR OBTAINING MOLDING POWDERS OF POLYTETRAFLUORO-ETHYLENE OF IMPROVED QUALITY
Giovanni Convalle, Bollate, Milan, and Pierluigi Sfondrini, Rho, Milan, Italy, assignors to Montecatini-Edison S.p.A., Milan, Italy
Filed July 11, 1966, Ser. No. 564,236
Claims priority, application Italy, July 13, 1965, 15,792/65
U.S. Cl. 241—84      4 Claims
Int. Cl. B02c 18/06

ABSTRACT OF THE DISCLOSURE

Grinding apparatus comprising a housing; a system of blades and counterblades disposed therein and defining a plurality of cutting pairs; and means for actuating the said system of blades and counterblades. The blade system is comprised of a plurality of blades radially arranged and parallelly affixed to the axis of a rotor disposed within the housing, which system is further disposed within a ring provided with a plurality of slot openings along its circumference. Such slot openings are slightly angled toward the direction of rotation of the said blades and provide a plurality of cutting edges substantially parallel to the cutting edges of the blades and functioning as counterblades.

---

The present invention relates to grinding apparatus for producing polytetrafluoroethylene powders, and, more particularly, to grinding apparatus for the production of highly flowable polytetrafluoroethylene powders suited for molding machines equipped with automatic feeding devices.

As is known, polytetrafluoroethylene suited for molding in machines equipped with mechanical feed means must be in a powdery state having a grading comprised between 200 and 1000 microns and must have a high flowability index, this latter characteristic being in fact indispensable in order to obtain during automatic dosing a uniform filling of the molds, thus avoiding clogging of the feeding means and voids or clots in the mold cavities, which would result in faulty finished products.

The flowability index of molding powders is directly proportional to the shape of the individual particles, which, when they exhibit filament-like and irregular aspects, easily tend to stick to each other forming aggregates detrimental to processing of the material, and, on the contrary, when the single particles have a rounded and smooth shape, they slide easily, one over the other, and the flowability index of the powder is satisfactory, in regards the automatic dosing or feeding of the molding.

It is known in the art that granular polytetrafluoroethylene is generally produced by polymerizing tetrafluoroethylene in an aqueous medium in the presence of catalysts and suitable suspending systems.

It is also known to produce fine polytetrafluoroethylene molding powders by subjecting a suspension of raw polytetrafluoroethylene in a liquid medium, for instance water, to prolonged mechanical stirring by means of usual type stirrers in vessels suited for enhancing the action of the stirrers, for example, vessels equipped with vertical ribs. In this manner polytetrafluoroethylene powders are obtained having sufficiently fine grading, however, the single particles exhibit a stringy and irregular aspect.

It is likewise known to produce molding polytetrafluoroethylene powders by subjecting to grinding a suspension in an aqueous medium of granular polytetrafluoroethylene, as obtained through polymerization, in a mill fitted with a blade rotor of the usual type.

The single particles of the powders thus obtained exhibit an irregular aspect. In order to eliminate such a drawback, the powder thus obtained is suspended in a liquid medium and subsequently subjected to stirring at temperatures comprised between 45° C. and 55° C. for periods of about eight hours, in order to confer to the particles of material a more regular aspect, thus increasing the flowability index of the powder.

A drawback inherent in the type of cut given to the single particles during the grinding and common to the different grinding systems consists of the fact that said particles exhibit a fibrous, stringy and irregular aspect that easily causes the particles to stick to one another, thereby giving rise to drawbacks such as packing of the polymer powder and the formation of voids inside the mass to be sintered.

Therefore, these powders are not suited for molding machines equipped with automatic dosing or feeding means, and thus are not suitable for most of the molding machines used in the industry.

A further disadvantage of known grinding processes resides in the fact that the polytetrafluoroethylene powders obtained, in order to attain a flowability index industrially acceptable, require aftertreatments that generally consist in submitting their aqueous suspension to prolonged stirring at temperatures greater than room temperature, which involves a considerable waste of time and energy.

It is, therefore, an object of this invention to provide special grinding apparatus which will permit the realization of fine polytetrafluoroethylene powders, while avoiding the drawbacks evidenced by conventional processes.

A further object of this invention is to provide special grinding apparatus suited for directly producing highly flowable fine polytetrafluoroethylene powders suited for use in molding machines equipped with automatic dosing or feeding means thereby avoiding the hereinbefore mentioned aftertreatments.

Still another object of this invention consists in providing a grinding machine of great simplicity, efficiency and cheapness, for obtaining directly during the grinding phase fine polytetrafluoroethylene powders of high flowability.

Yet another object of this invention is that of providing grinding apparatus for polytetrafluoroethylene, which will produce powders whose single particles present a smooth, regular structure, due to the gradual and net cut that the grinding means effect on the said particles.

A still further object of this invention is that of providing highly flowable fine polytetrafluoroethylene powders with a prefixed particle grading according to requirement and comprised between 250 and 650 microns, simply by prolonging the grinding treatment.

All these objects and others which will be apparent to one skilled in the art from the following detailed description, can be achieved according to this invention which also affords considerable advantages in comparison to known techniques of the prior art.

An advantage that favorably influences the cheapness and quality of the product resides in the fact that fine polytetrafluoroethylene powders of a high flowability index are directly obtained from the grinding phase due to the particular cut that the grinding apparatus according to this invention effects on the particles, thereby avoiding the waste of time and energy involved in the aftertreatments attendant art procedures.

According to the present invention, a granular polytetrafluoroethylene suspension in a liquid medium is ground in a specal grinding apparatus, whose cutting means comprise a system of blades and counterblades which are so arranged and suitably oriented that their sharp profiles, owing to relative movement, skim each other with a clearance reduced to the minimum indispensable for movement, thus forming cutting couples capable of imparting to the particle which falls within their radius of action a gradual and clear cut, while the material to be ground is continuously fed to the cutting zone by flows or currents caused inside the liquid by the centrifugal effect due either to the movement of the blades themselves or by other means, and the powder thus obtained is finally separated from the suspension medium and dried.

For purposes of illustration and not limitation, a preferred embodiment of an apparatus according to this invention will now be described with reference to attached drawing, wherein:

FIG. 1 represents a longitudinal cross-section of said apparatus which is comprised of a rotor carrying a system of radially arranged vertical blades oriented according to the axis of the rotor on which they are mounted; the assembly formed by these blades rotates inside a cylindrical ring of suitable material and thickness, in which slots have been made spirally arranged with respect to the axis of said cylindrical ring and slightly inclined in the direction of rotation of the blades with a sharp vertical edge, which acts as a counterblade, the gap between the cutting profiles of the blades and the sharp vertical edges being reduced to the minimum admitted to allow the free rotary movement of the blade system. To the upper and lower rims of the cyclindrical ring are fitted two truncated cone shaped conduits, fixed to each other and, furthermore, to the cylindrical ring by vertical plates radially arranged outside said conduits and cylindrical ring in correspondence to the free slotless spaces of the cylindrical ring; said provided vertical plates act as antisloshing baffles and, while they hinder the forming of a horizontal rotary flow inside the suspension externally to the grinding assembly due to the centrifugal effect of the motion of the blades, which flow would keep out of the grinding zone a considerable portion of the material to be ground, such baffles, on the contrary, due to said effect of the motion of the blades, cause the formation of pairs of fluid flows or currents equal in number to the number of the plates themselves, vertically directed respectively upwards and downwards (as indicated by the arrows in the drawing), thus continuously feeding the material to be ground to the cutting zone.

The grinding assembly is housed inside a vessel that contains the suspension to be ground and is connected at the top to the cover, while the lower part thereof rests by means of suitable supports on the bottom of the vessel itself.

Figure 1:
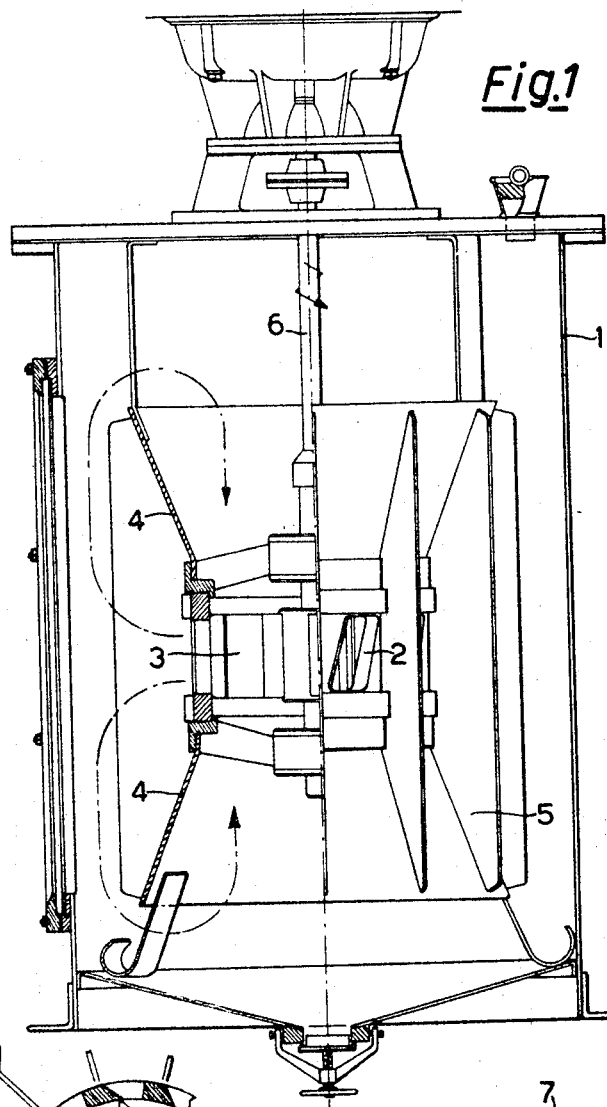

The arrow shows the direction of rotation of the blades. More particularly, FIGURE 1 depicts:

1—The vessel containing the suspension of polytetrafluoroethylene granules to be ground, in which the grinding assembly is submerged.

2—The cylindrical ring on which the slots have been cut with a sharp edge that forms the counterblade (No. 7 of FIG. 2) and inside which the rotor revolves carrying the system of the blades 3.

3—The rotor on which there is mounted the system of radially arranged vertical blades whose gap with respect to the cylindrical ring is reduced to the minimum indispensable for allowing the rotary motion of said blades.

4—The two truncated cone shaped conduits fixed at the rims of the cylindrical ring and interconnected by the radial plates 5.

5—The vertical plates radially arranged with respect to the vertical axis of the apparatus and fixed externally to the conical conduits 4 and to the cylindrical ring 2, which plates act as antisloshing baffles and direct the flow currents produced inside the suspension by the centrifugal effect of the blade motion in the directions shown by the arrows of the figure.

6—The driving shaft that, connected to a suitable motor, transmits the rotary motion to the granding rotor.

Figure 2:
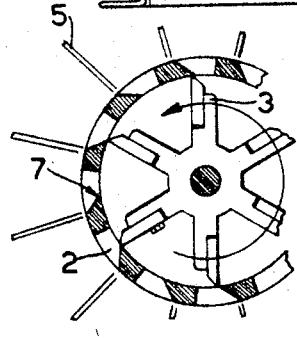
FIG. 2 represents the transverse mid cross-section of the grinding assembly formed by the rotor carrying the radially arranged vertical blades, by the cylindrical ring with slots fitted with counterblade edges, and by the antisloshing baffles radially arranged on the outside of the cylindrical ring and coinciding with the spaces of the latter free of slots.
Figure 3:
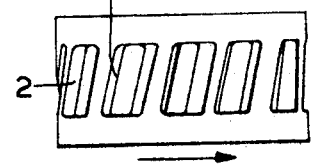
FIG. 3 represents in detail a segment of the cylindrical ring in which a number of slots with a sharp edge have been made and the same depicts the shape and slant of said slots with respect to the vertical axis of the grinding apparatus, this slant having been purposely studied in order to ensure a gradual and exact cutting action.

In FIG. 2 the following details are shown:

2—The transverse cross-section of the slots cut into the cylindrical ring.

5—The antisloshing baffles.

7—The cutting profile of the edge of the slot, which acts as a counterblade.

An example of a process, when using the above described equipment, is the following:

Vessel 1 is filled with the suspension of granular polytetrafluoroethylene to be ground, the content in granular polytetrafluoroethylene ranging from 5% to 10% by weight with respect to the suspending liquid.

Into this vessel 1, containing the suspension, there is lowered the grinding apparatus, which will be immersed in the liquid slightly beyond the rim of the upper truncated cone shaped conduit 4; a conventional driving motor through driving shaft 6 transmits a rotary motion to the rotor which carries the system of blades. The grinding is stopped as soon as the powder in the suspension has reached the desired average grading. Thereupon the liquid is separated from the suspended powder by means of known methods such as, for example, filtration or centrifuging, and the powder thus separated is dried, for instance in an oven. The duration of the grinding operation is obviously dependent on the length and on the number of cutting profiles, at equal number of revolutions per minute, and in relation to the number of revolutions per minute at which the rotor is made to revolve, as well as in relation to the grading of the starting raw material and to the desired grading of the powder to be obtained.

The starting raw material according to the present invention, in order to be subjected to grinding, must be suspended in a liquid medium (for example water).

It is, however, possible to directly subject to grinding said material in the aqueous suspension that is obtained following polymerization in an aqueous medium of tetrafluoroethylene.

The ratio between the weight of the polymer to be ground and the volume of the suspending liquid, for example water, is not critical. Nevertheless, advantageous results have been obtained with values comprised in the range of from 50 gr./l. to 100 gr./l., and preferably around 75 gr./l.

The volume of the liquid contained in the vessel 1 of the grinder must be such that it will be completely subject to the current flows caused by the centrifugal effect of the blades 3, without the creation of dead zones, where the material to be ground could deposit itself or somehow escape the grinding action.

The temperature at which the grinding is carried out is not critical and may be comprised in the range from 10° C. to 60° C., and preferably at about room temperature.

The powders obtained according to this invention exhibit a grading, as established according to ASTM D1457 standards, comprised in the range of from about 250 to 650 microns.

Said powders have an apparent density, as determined according to ASTM D1457 standards, comprised in the range of from about 550 to 650 gr./l.

The flowability index of the polytetrafluoroethylene powders is evaluated by means of filling a cylindrical vessel of 50 mm. internal diameter and of 145 mm. height, closed at the bottom by a metal net of 10 mesh (Tyler series), which is made to vibrate at a frequency of 10 cycles/second, with a stroke of 10 mm., and by measuring the time required to pass through said net an established quantity of powder.

crons. Under a microscope with an enlargement of 26 times, the particles of said powder appeared of rounded shape, facetted with smooth surfaces.

With the same equipment and following the same procedure used in Example 1, there were carried out Examples 2 and 3, in which, with respect to Example 1, there was varied the duration of the grinding, thus obtaining powders having different gradings.

The following table summarizes the data of the three examples:

TABLE 1

| Examples | Final temp. (° C.) | Duration of grinding minutes | Mean diameter of particles in microns | Apparent density in gr./l. | Flowability in gr./sec. | Particle aspect | Leveling capacity |
|---|---|---|---|---|---|---|---|
| 1 | 45 | 45 | 300 | 590 | 14 | Round | Good. |
| 2 | 22 | 15 | 430 | 575 | 14 | do | Do. |
| 3 | 16 | 8 | 520 | 565 | 16 | do | Do. |

Said flowability index of polytetrafluoroethylene powders obtained according to this invention attains very high values, such as, for example, about 17 gr./sec. and more.

The polytetrafluoroethylene powders obtained according to this invention exhibit furthermore a good capacity to be leveled. This characteristic has been estimated qualitatively on the basis of the possibility to level said powders in a mold having a size of 250 x 250 x 10 mm. by means of a suitable levelling device.

The process herein described may be applied also to other polymers which, in order that they may be subjected to molding must be in the state of fine powders. Among these polymers, there may be listed various co- Furthermore, in order to better illustrate the characteristics of the powders obtained according to this invention, in the following Table 2 there are recorded the data corresponding to the characteristics of polytetrafluoroethylene powders having an average grading of the same size order, as obtained by different methods currently in use in the technical field.

From a comparison of these data, it is evident that the powders obtained according to this invention, besides being produced in a way far more convenient by its simplicity, and efficiency with respect to usual methods, at equal grading they have better flowability characteristics than the smoothest flowing powders commercially available.

TABLE 2

| Type of powder | Mean diam. of particles in microns | Apparent density, gr./l. | Flowability index, gr./sec. | Aspect of particles | Levelling capacity |
|---|---|---|---|---|---|
| A | 290 | 490 | 5 | Fibrous | Difficult |
| B | 300 | 510 | 7 | do | Do. |
| C | 320 | 600 | 12 | Round | Good. |
| D | 300 | 590 | 14 | do | Do. | polymers based on tetrafluoroethylene, polychlorofluoroethylene and others.

In order to further illustrate the present invention and the advantages thereof, the following specific examples are given, it being understood that there are merely intended to be illustrative and not limitative.

EXAMPLE 1

1200 gr. of granular polytetrafluoroethylene having an average grading of about 3 mm. are suspended in 18 l. of water and introduced at room temperature in the 21 litre capacity cylindrical vessel of the grinder shown in the drawing.

The grinding apparatus is comprised of a rotor which carries 6 blades of special steel having a sharp cutting profile of 40 mm. of length and radially arranged inside a cylindrical ring fitted with counterblades of equal length and having an inside diameter of 115 mm. The difference or gap between diameters of the rotor carrying blades and of the cylindrical ring was of 3/100 mm.

The system of cutting blades is made to rotate at a speed of 1200 r.p.m. for a period of about 45 minutes. After this time the grinding is stopped and the suspension is discharged from the apparatus; and the product is then separated from the suspending liquid by filtration and dried in an oven.

The powder thus obtained exhibits a flowability index, calculated according to the standard cited above, equalling 14 gr./sec. and has an average grading of 300 mi- Powder A was obtained by grinding the dry raw polymer in a knife pulverizer of the firm Meccanoplastica (Cast. Olona) Mod. 150 Econ, working at a speed of 2990 r.p.m.

Powder B was obtained by grinding the raw polymer suspended in water in a Waring Blendor of the Cenco Italiana, Stanard Laboratory Model 700, having a speed of about 15,000 r.p.m.

Powder C was obtained by subjecting powder B, suspended in water, to stirring for 8 hours at 50° C.

Powder D was obtained according to this invention (Example 1).

What is claimed is:

1. Grinding apparatus comprising a housing; a system of blades and counterblades disposed therein and defining a plurality of cutting pairs, with the gap between the respective cutting edges of said cutting pairs being the minimum indispensable for relative movement, the said system of blades being comprised of a plurality of blades radially arranged and parallely affixed to the axis of a rotor disposed within said housing and the system of blades further being disposed within a stationary cylindrical ring provided with a plurality of slot openings along its circumference, which openings are slightly angled toward the direction of rotation of the said blades thus providing a plurality of cutting edges substantially parallel to the cutting edges of said blades and functioning as counterblades; and means for actuating the said rotor.

2. The grinding apparatus of claim 1, further provided with a pair of conduits, one disposed above and the other below the said cylindrical ring and connected thereto and to each other by a plurality of antisloshing baffles outwardly extending, radially arranged and parallely affixed to the longitudinally axis of the said cylindrical ring within the spaces between the slot openings thereof.

3. The grinding apparatus of claim 2, wherein the conduits are in the form of truncated cones.

4. The grinding apparatus of claim 1, wherein the cutting edges of the counterblades are shaped as a spiral section whose axis is the axis of rotation of the rotor.

References Cited

UNITED STATES PATENTS

| ,536,928 | 1/1951 | Hammell | 241—84 |
| 2,852,199 | 9/1958 | Holzer | 241—83 |
| 2,890,840 | 6/1959 | Fletcher et al. | 241—86 |
| 2,947,486 | 8/1960 | Higer | 241—83 |
| 3,073,535 | 1/1963 | Vokes | 241—46 |

GERALD A. DOST, *Primary Examiner.*

U.S. Cl. X.R.

241—97